United States Patent [19]

Chiou et al.

[11] Patent Number: 5,586,106
[45] Date of Patent: Dec. 17, 1996

[54] DISC DETAINING DEVICE FOR DISC DRIVES

[75] Inventors: Yee-Haur Chiou, Janghwah; Wei-Hsin Hwang, Hsinchu, both of Taiwan

[73] Assignee: Industrial Technology Research Institute, Hsinchu Hsien, Taiwan

[21] Appl. No.: 398,306

[22] Filed: Mar. 2, 1995

[51] Int. Cl.$^6$ .................................................. G11B 17/028
[52] U.S. Cl. ........................................ 369/270; 360/99.12
[58] Field of Search .............................. 360/99.12, 99.05; 369/270–271, 75.2, 77.2

[56] References Cited

U.S. PATENT DOCUMENTS

| | | | |
|---|---|---|---|
| 4,680,748 | 7/1987 | Kobayashi | 369/271 |
| 4,797,873 | 1/1989 | Nobutani | 369/270 |
| 4,829,501 | 5/1989 | Seto et al. | 369/270 |
| 5,172,361 | 12/1992 | Urushibata et al. | 369/270 |

FOREIGN PATENT DOCUMENTS

| | | | |
|---|---|---|---|
| 63-282952 | 11/1988 | Japan | 369/270 |
| 4-69873 | 3/1992 | Japan | 369/279 |

*Primary Examiner*—Stuart S. Levy
*Assistant Examiner*—Brian E. Miller
*Attorney, Agent, or Firm*—W. Wayne Liauh

[57] ABSTRACT

A detaining device for use in a disc drive for loading/unloading and detaining a disc, especially an optical CD-ROM disc, in the read/write position; it comprises: (a) a turn table for supporting the disc; (b) a slidable detainer having a recessed portion; and (c) a guiding plate having a guiding slot near the middle thereof, the slot being dimensioned for allowing the detainer to move back-and-forth in the direction of the loading/unloading of the disc. The turn table is slidably movable between the opened position and the read/write position during the loading/unloading of the disc, and has a conically-surfaced center jut which is projected from the center of the jut for receiving the disc via a central hole provided in the disc. The recessed portion is provided with a recessed surface matching the conically-surfaced center jut of the turn table so as to cooperatively and firmly detain the disc when the disc is in the read/write position. The guiding slot has a leveled portion and an upwardly-curved portion; the leveled portion is equally distanced from the turn table so as to allow the detainer to be engaged with the center jut of the turn table when the turn table is pushed into the read/write position during a loading operation of the disc, and the upwardly-curved portion provides increased distance between the slot and turn table away from the read/write position, so as to cause the detainer to be separated from the center jut of the turn table when the turn table is moved away from the read/write position during an unloading operation. A pair of magnetic members are provided in the center jut and the recessed portion so as to cause them to be in a locked position when the detainer and the turn table are simultaneously pushed into the read/write position.

6 Claims, 8 Drawing Sheets

FIG.10D

DISC DETAINING DEVICE FOR DISC DRIVES

FIELD OF THE INVENTION

The present invention relates to disc drives, and more particularly, to a disc detaining mechanism for use in the disc drives for loading/unloading and detaining a disc in read/write position.

DESCRIPTION OF PRIOR ART

With the coming of the multimedia age, a CD-ROM becoming a much needed input device for the computer. A conventional type of CD-ROM drive uses a steel ball or a pin to detain the disc in position. It drawback of this type of CD-ROM drive, however, that the disc can easily get scratched, thereby damaging the data.

Figure 1:
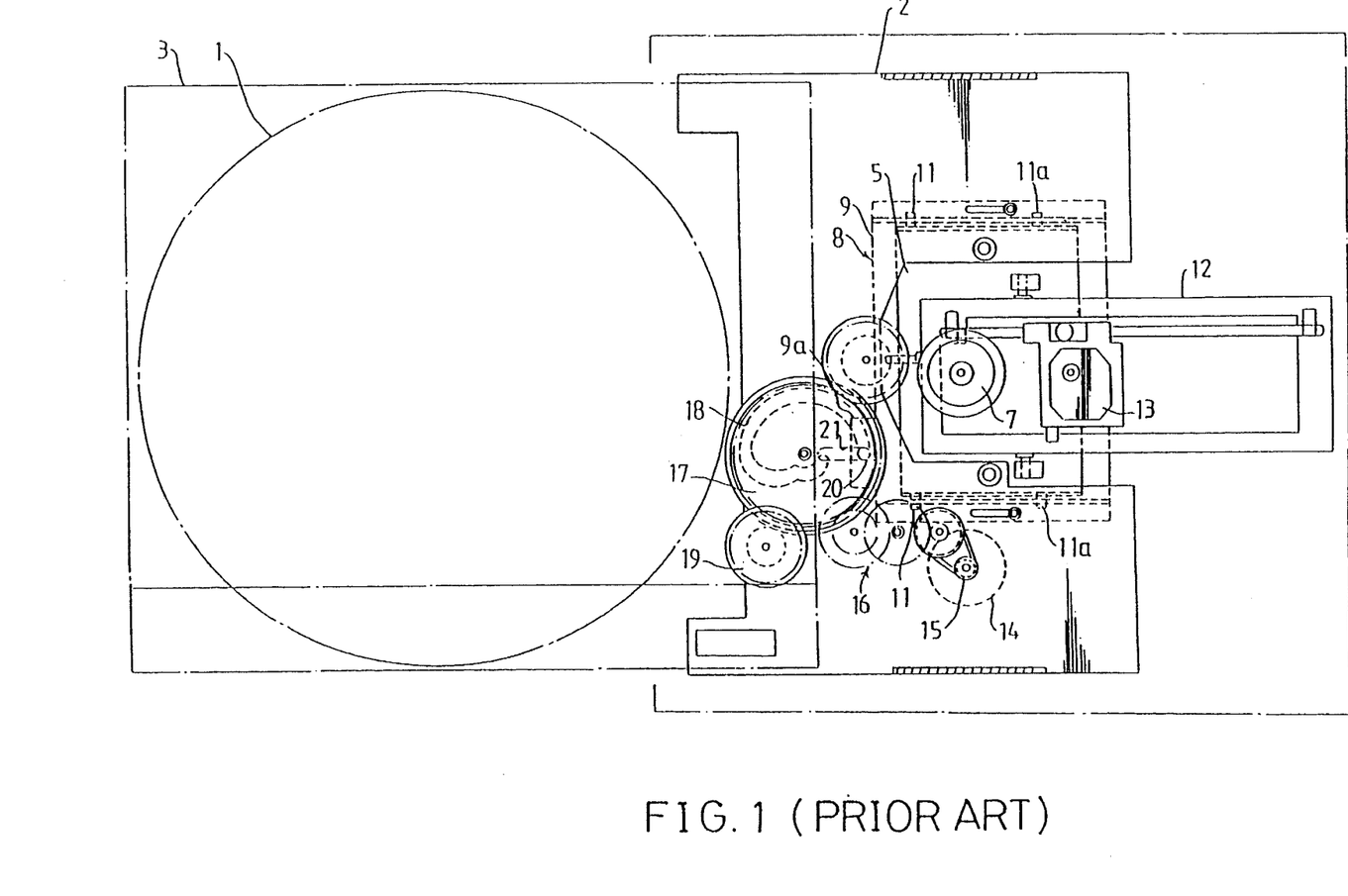
FIG. 1 shows a disc drive utilizing a conventional way of detaining discs.
Figure 2A:
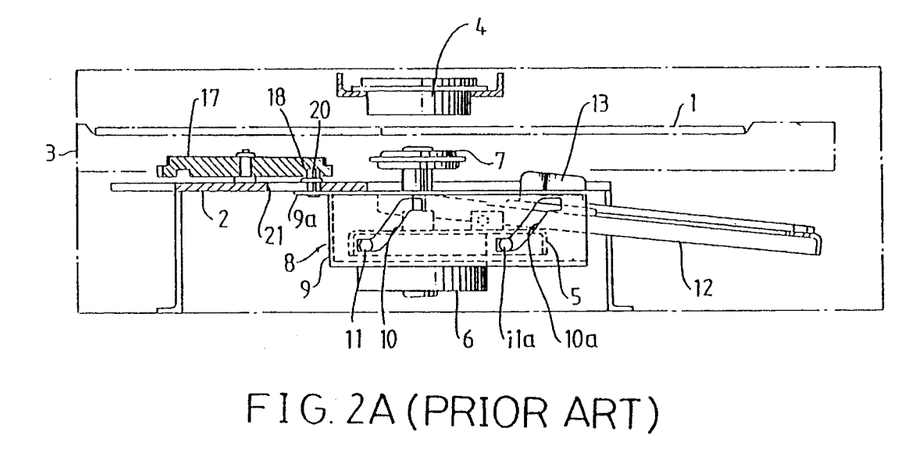
FIGS. 2A–2B are side views of the conventional disc drive of FIG. 1.
Figure 2B:
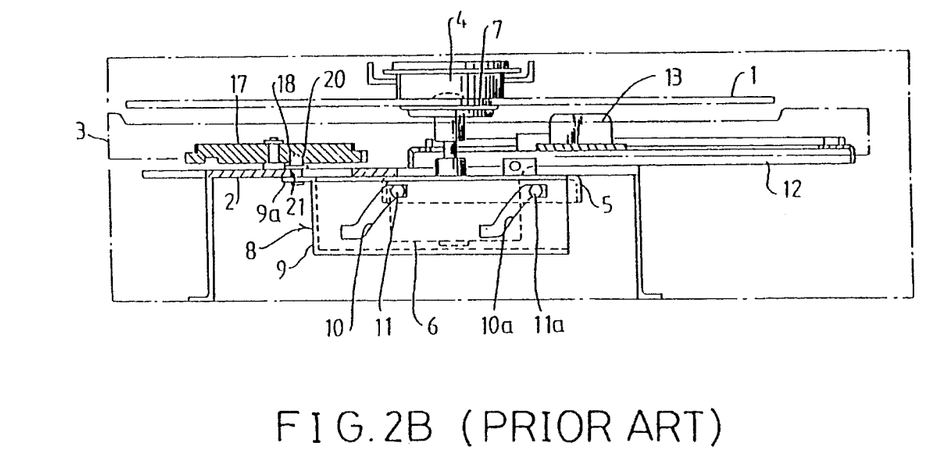

Another type of CD-ROM drive uses a cam groove and a linkage bar to detain the disc as disclosed in U.S. Pat. No. 5,172,361 entitled "Disc Loading Apparatus". The structure of the disc loading apparatus is illustrated in FIGS. 1 and 2A–2B, wherein FIG. 2A shows the condition in which the disc is about to be detained, and FIG. 2B shows the condition in which the disc is in the detained position. In operation, a motor 14 transmits its driving power via a pulley 15, a reduction gear train 16, a rotary operation member 17, and an idle gear 19 to a disc tray 3, thereby moving the disc in (loading) and out of (unloading) the disc drive. The rotary operation member 17 includes a cam groove 18 devised into three functioning sections: loading area, chucking area and tilt area. Referring to FIG. 2A, the front end a of a slide member 9 is provided with a pin 20 passing through an elliptical opening 21 on a stationary chassis 2 to the inside of the cam groove 18. A movable chassis 5 is supported by the stationary chassis 2. A a spindle motor 6 used to drive the disc 1 is fixed to the movable chassis 5. Therefore, during the loading process, an elevating mechanism 8 can be moved within the chucking area on the cam groove 18 by means of supporting pins 11, 11a provided inside elongated openings 10, 10a on the slide member 9. This, in turn causes the movable chassis 5 to move upwards to raise a disc table 7 to a position where the disc is detained by a rotatable chucking member 4. At the same time, a read supporting frame 12 is horizontally oriented, allowing an optical read head 13 to read data from the disc 1, as illustrated in FIG. 2B.

This type of CD-ROM performs very well in the loading and unloading of the disc: however, it is complex in structure and thus costly in manufacture.

SUMMARY OF THE INVENTION

It is a primary objective of the present invention to provide a disc detaining mechanism that allows better performance in detaining the disc in the read/write position.

It is another objective of the present invention to provide a disc detaining mechanism that is simple in structure, thereby allowing ease of assembly and reduction in cost.

It is still another objective of the present invention to provide a disc detaining mechanism that allows the disc drive to be made more compact.

In accordance with the foregoing and other objectives of the present invention, there is provided a novel detaining device for use in disc drive for loading/unloading and detaining a disc in read/write position. The disc detaining device comprises a turn table for supporting the disc, which has a conically-surfaced center jut projecting from the center. A detainer having a recessed portion is provided to be coupled with the center jut of the turn table when thee disc is in read/write position. A guiding plate having a slot is provided to allow the detainer to move in the direction of the loading/unloading of the disc. The guiding plate has an upward-curved portion along the disc loading/unloading path.

By the foregoing arrangement, the turn table and the detainer move outward and are separated by means of the upward-curved portion of the guiding plate such that only the turn table moves to the outside of the disc drive during disc ejection. And during disc loading, the detainer is brought along the slot of the guiding plate to detain the disc in the cad/write position by means of the center jut of the turn table.

Furthermore, the detainer, comprising a magnetic member and the center jut of the turn table, is made of material attractable to magnetism so that in read/write position the magnetic attraction therebetween detains the disc tightly between the detainer and the turn table.

BRIEF DESCRIPTION OF THE DRAWINGS

The present invention can be more apparent by reading the following detailed description of the preferred embodiments thereof with references made to the accompanying drawings, wherein.

DETAILED DESCRIPTION OF THE PREFERRED EMBODIMENTS

Figure 3A:
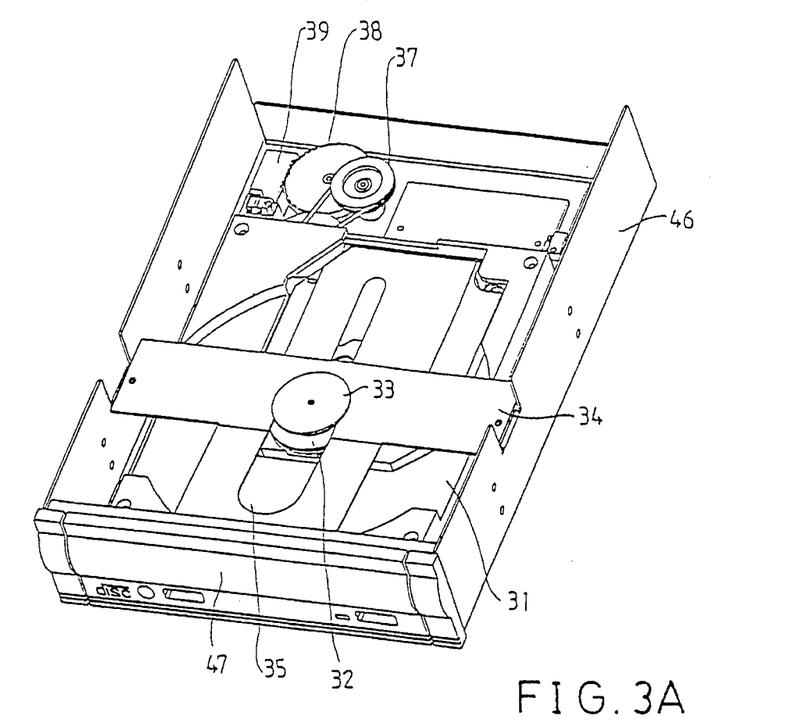
FIG. 3A is a perspective view of a preferred embodiment of the disc detaining mechanism according to the present invention.
Figure 3B:
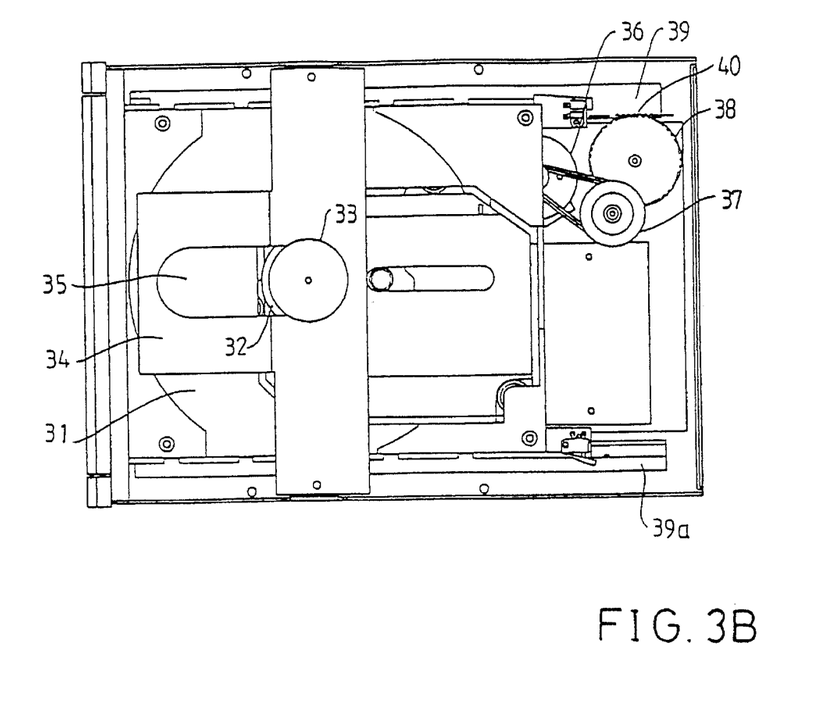
FIG. 3B is a top view of the disc detaining mechanism of FIG. 3A.
Figure 4A:
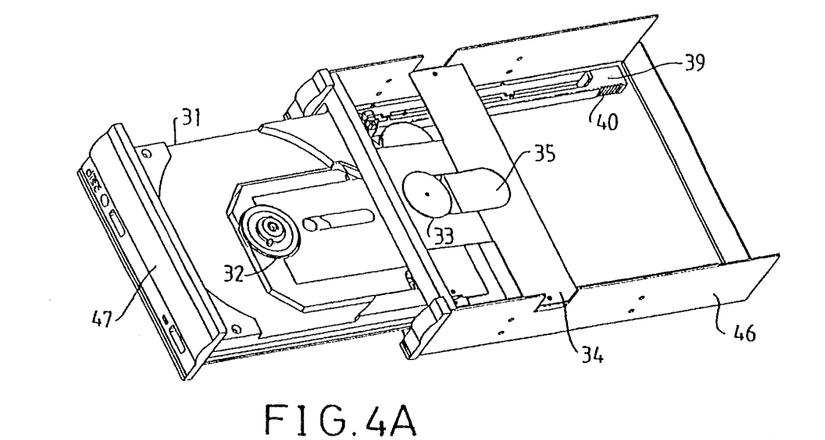
FIG. 4A shows a perspective view of the disc detaining mechanism when the disk turn table is pulled out of the disc drive.
Figure 4B:
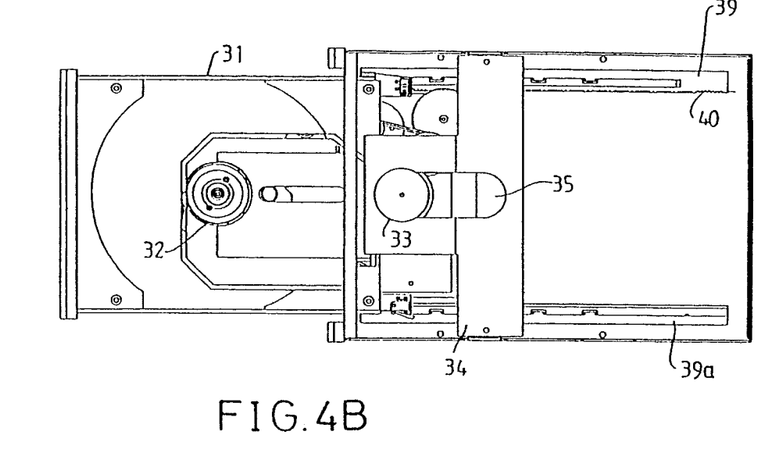
FIG. 4B is a top view of FIG. 4A.

Referring to FIGS. 3A–3B, the optical disc drive, according to the present invention is composed of a disc support 31, a disk turn table 32, a detainer 33, a guiding plate 34 having a guiding slot 35, a first motor 36 for shifting the disc support 31, a pulley 37, a gear 38, rails 39, 39 a, a spiral bar 40, a casing 46, and a front panel 47. The motor 36 transmits its power via the pulley 37, the gear 38, and the spiral bar 40 to the disc support 31, thereby moving the disc in and out of the optical drive. FIGS. 4A and 4B show that the disc has moved out of the disc drive.

FIGS. 5A–5C and FIG. 6 depict how the turn table 32 and the detainer 33 are engaged with and disengaged from each other when the disc support 31 is moved in and out of the optical drive. In these drawings, the numeral 32A denotes a conically-surfaced center jut of the turn table 32, 33A denotes a recessed portion of the detainer 33, 41 denotes the disc, 42 denotes a second motor for driving the turn table 32, and 43 denotes a magnetic member. A dashed line 44 is used as a reference line for indicating the in-position status of the (i.e. where the center line of the turn table will be positioned). 35a and 35b denote the two ends of the guiding slot 35.

Figure 5A:
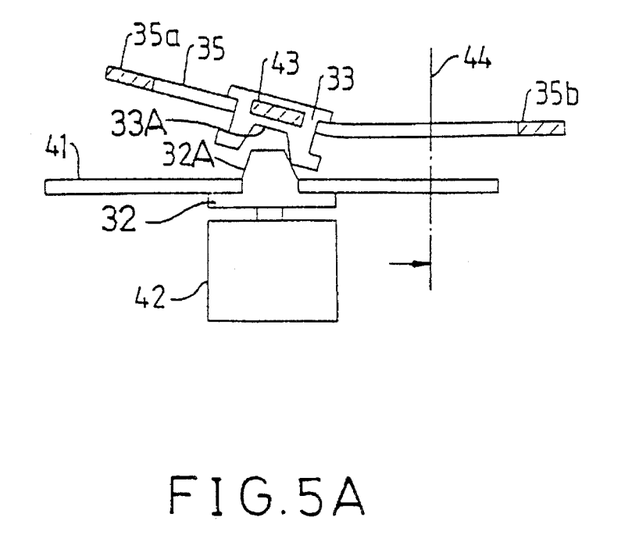
FIGS. 5A–5C are schematic drawings, showing how the disc is inserted into and pulled out of the disc drive.
Figure 5B:
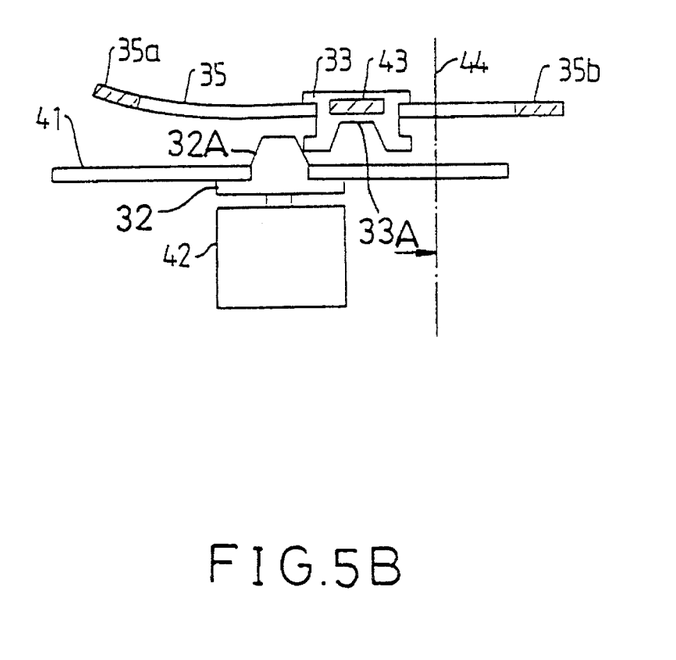
Figure 5C:
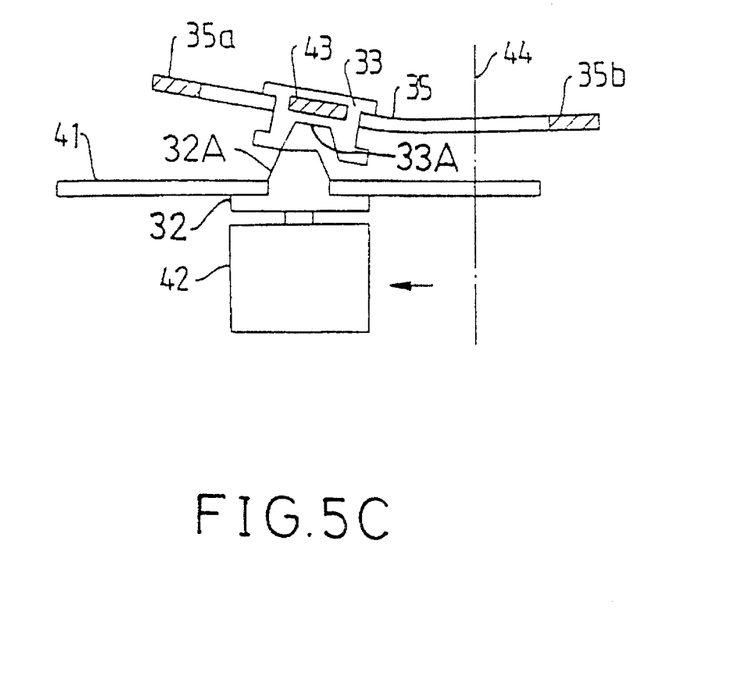

When the disc 41, which has an opening through its center, is placed on the turn table 32, the jut 32A from the axis of the turn table 32 secures the disc 41. The motor 36 then transmits its power via the gear 38 and spiral bar 40 to the turn table 32 to move the disc 41 along the rails 39, 39a into the disc drive. During the disc loading, the detainer 33 is shifted along the guiding slot 35.

Figure 6:
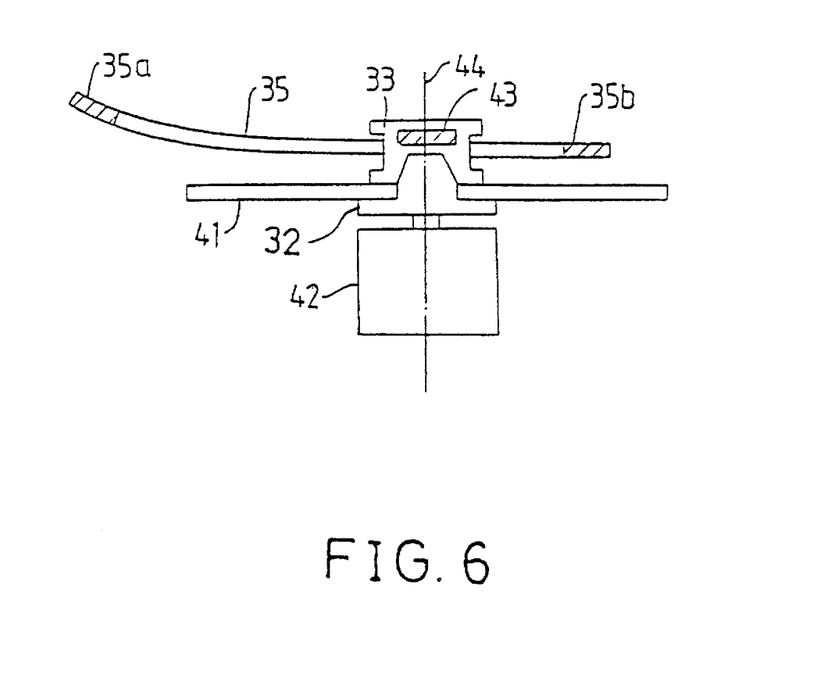
FIG. 6 is a schematic drawing showing the disc inserted in position in the disc drive.

If the detainer 33 is at the position as shown in FIG. 5A, it can be brought into the read/write position 44 with the help of the conical surface of the center jut 32A of the turn table 32. At this time, the magnetism of the magnetic member 43 attracts the center jut 32A (which is made of metal attractable to magnetism) of the turn table 32, thereby detaining the disc securely therebetween, as illustrated in FIG. 6.

If the detainer 33 is at the position as shown in FIG. 5B, the center jut 32A of the turn table 32 pushes the detainer 33. When the detainer 33 touches the end 35b of the guiding slot 35, the movement of the turn table 32 causes the detainer 33 to be raised along the conical surface of the center jut 32A of the turn table 32, then the center jut 32A enters the recessed center section section 33A of the detainer 33 and is held by the detainer 33 tightly in the position 44 as illustrated in FIG. 6. At this time, since the detainer 33 is smaller in its diameter than the blank range at the center of the disc where data are not written, no damage will be caused to the data.

Referring to FIG. 5C, when the disc 41 is to be pulled out of the disc drive, the detainer 33 will be moved outwards along with the turn table 32. The guiding slot 35 has an upward-curved portion that separates the detainer 33 from the turn table 32 and a leveled portion parallel to a horizontal plane defined by the turntable. The slope and shape of the upward-curved portion is designed to allow the detainer 33 and the turn table 32 to approach each other during disc loading and separate from each other during disc ejection. When the front end of the turn table 32 is separated from the detainer 33, the turn table 32 keeps being pulled out of the disc drive and the detainer 33 stays at the slanted portion of the guiding slot 35.

Figure 7:
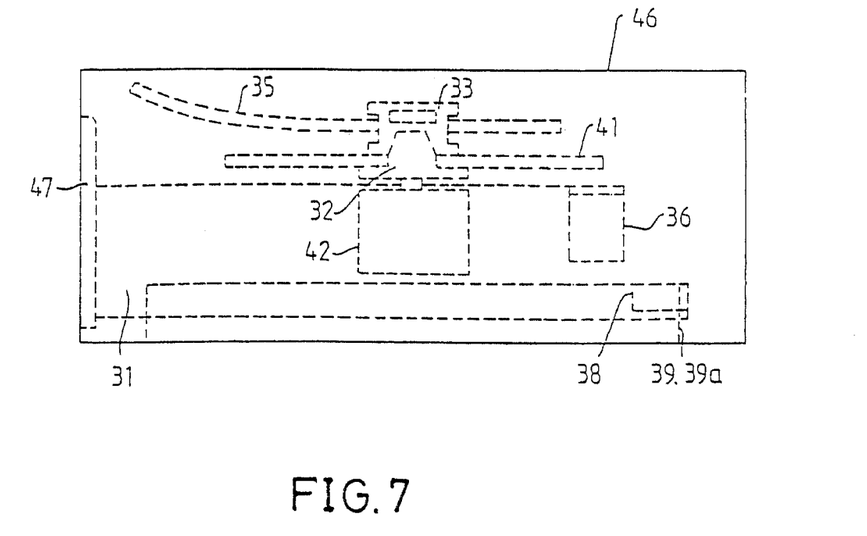
FIG. 7 is another schematic drawing showing the disc, inserted in position in the disc drive.

FIG. 7 is a schematic drawing depicting the disc being placed in read/write position with the detainer 33 detaining the disc tightly on the turn table 32. In the read/write position, read or write operations can be performed to the disc.

Figure 8:
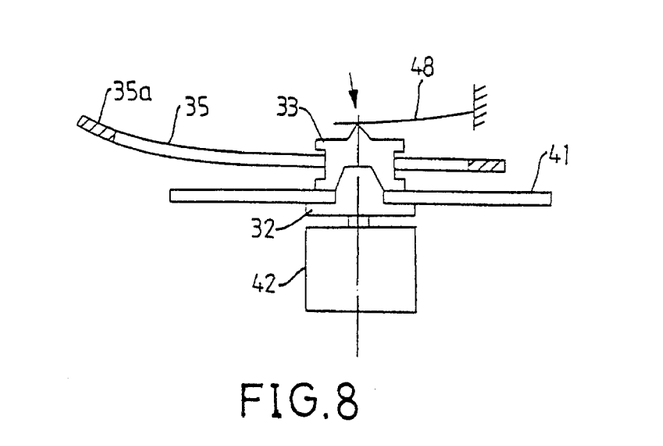
FIG. 8 is a schematic drawing of an alternative embodiment of the present invention showing the detainer held elastically with a spring.
Figure 9A:
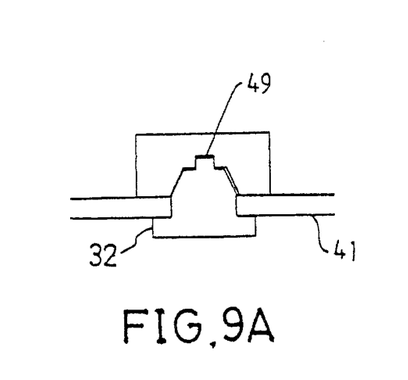
FIG. 9A–9B are schematic drawings of alternative embodiments showing the turn table of the present invention provided with projecting and recessed center respectively.
Figure 9B:
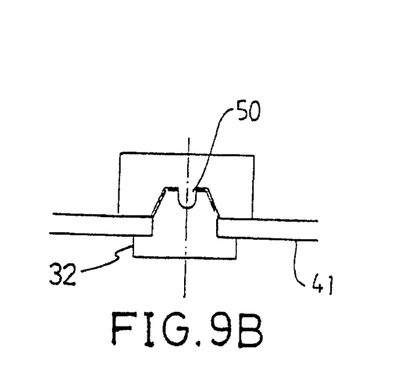
Figure 10A:
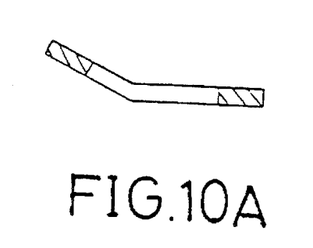
FIG. 10A–10D are schematic drawings of alternative embodiments showing variable slopes and shapes of the guiding plate of the present invention.
Figure 10B:
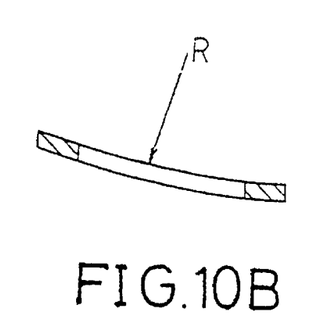
Figure 10C:
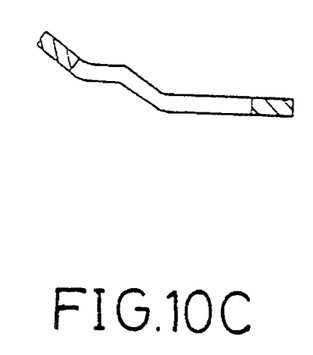
Figure 10D:
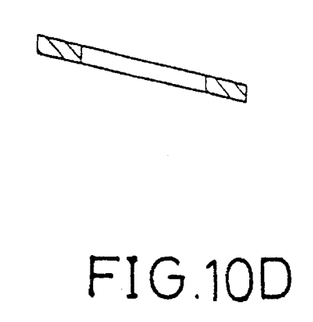

In other embodiments, elasticity of a spring 48 can be used in substitute for the magnetic member 43 to hold the detainer 33 tightly to the turn table 32, as shown in FIG. 8. Furthermore, the turn table 32 can be provided with projecting center 49 or recessed center 50, as shown in FIG. 9A and 9B respectively, along with the detainer 33 provided with the recessed or projecting center, so as to facilitate better engagement. Otherwise, the guiding plate 34 of the present invention can be provided with variable slopes and shapes as desired, as illustrated in FIG. 10A–10D.

It can be learned from the foregoing description that the disc detaining mechanism for use in the disc drive, according to the present invention is simple in structure, easy in assembly, and more compact in its size. It also provides better performance in the detaining of the disc.

The present invention has been described hitherto with exemplary preferred embodiments. However, it is to be understood that the scope of the present invention is not necessary to be limited to the disclosed preferred embodiments. On the contrary, it is intended to cover various modifications and similar arrangements within the scope described in the following appended claims. The scope of the claims should be accorded the broadest interpretation so as to encompass all such modifications and similar arrangements.

What is claimed is:

1. A detaining device for use in a disc drive for loading/unloading and detaining a disc in the read/write position, comprising:
    (a) a turn table for support the disc, said turn table being slidably movable between an opened position and the read/write position during the load/unloading of the disc, said turn table having a conically-surfaced center jut projecting from the center thereof for receiving the disc via a central hole provided in the disc;
    (b) a slidable detainer having a recessed portion, said recessed portion having a recessed surface matching said conically-surfaced center jut of said turn table so as to cooperatively and firmly detain the disc when the disc is in the read/write position;
    (c) a guiding plate having a slot, said slot being dimensioned such that said detainer is engaged with said slot and moves in the direction of the loading/unloading of the disc;
    wherein said slot has a leveled portion and an upwardly-curved portion, said leveled portion is parallel to a horizontal plane defined by the turn table so as to allow said detainer to be engaged with said center jut of said turn table when said turn table is pushed into the read/write position during a loading operation of the disc, and said upwardly-curved portion provides increased distance between said slot and turn table away from the read/write position, so as to cause said detainer to be separated from said center jut of said turn table when said turn table is moved away from the read/write position during an unloading operation.

2. A detaining device as claimed in claim 1, wherein said detainer comprises a magnetic member and the center jut of said turn table is made of a material attractable to magnetism so that in the read/write position the magnetic attraction therebetween causes the disc to be tightly detained between said detainer and said turn table.

3. A detaining device as claimed in claim 1, wherein said detainer and said turn table are held tightly by elastic force in the read/write position.

4. A detaining device for use in a disc drive for loading/unloading and detaining a disc in the read/write position, comprising:
    (a) a turn table for supporting the disc, said turn table being slidably movable between an opened position and the read/write position during the load/unloading of the disc, said turn table having a conically-surfaced recess near the center thereof, (b) a slidable detainer having a center jut projecting from the center thereof for receiving the disc via a central hole provided in the disc, said center jut of slidable detainer having a projected surface matching said conically-surfaced recess of said turn table so as to cooperatively and firmly detain the disc when the disc is in the read/write position;

(c) a guiding plate having a slot, said slot being dimensioned such that said detainer in engaged in said slot and moves in the direction of the loading/unloading of the disc;

wherein said slot has a leveled portion and an upwardly-curved portion, said leveled portion is parallel to a horizontal plane defined by the turntable so as to allow said detainer to be engaged with said center jut of said turn table when said turn table is pushed into the read/write position during a loading operation of the disc, and said upwardly-curved portion provides increased distance between said slot and turn table away from the read/write position, so as to cause said detainer to be separated from said center jut of said turn table when said turn table is moved away from the read/write position during an unloading operation.

5. A detaining device as claimed in claim 4, wherein said detainer comprises a magnetic member and the center jut of said turn table is made of a material attractable to magnetism so that in the read/write position the magnetic attraction therebetween causes the disc to be tightly detained between said detainer and said turn table.

6. A detaining device as claimed in claim 4, wherein said detainer and said turn table are held tightly by elastic force in the read/write position.

* * * * *